US011359034B2

(12) United States Patent
Corberan Roc et al.

(10) Patent No.: US 11,359,034 B2
(45) Date of Patent: Jun. 14, 2022

(54) PROCESS FOR PREPARING HIGH-REACTIVITY ISOBUTENE HOMO- OR COPOLYMERS

(71) Applicant: BASF SE, Ludwigshafen am Rhein (DE)

(72) Inventors: Rosa Corberan Roc, Ludwigshafen (DE); Klaus Muehlbach, Ludwigshafen (DE); Thomas Wettling, Ludwigshafen (DE); Sergei V. Kostjuk, Minsk (BY); Irina Vasilenko, Minsk (BY); Dmitryi Shiman, Minsk (BY)

(73) Assignee: BASF SE, Ludwigshafen am Rhein (DE)

( * ) Notice: Subject to any disclaimer, the term of this patent is extended or adjusted under 35 U.S.C. 154(b) by 221 days.

(21) Appl. No.: 16/634,697

(22) PCT Filed: Aug. 7, 2018

(86) PCT No.: PCT/EP2018/071355
§ 371 (c)(1),
(2) Date: Jan. 28, 2020

(87) PCT Pub. No.: WO2019/034477
PCT Pub. Date: Feb. 21, 2019

(65) Prior Publication Data
US 2020/0207887 A1 Jul. 2, 2020

(30) Foreign Application Priority Data

Aug. 17, 2017 (EP) .................................. 17186534

(51) Int. Cl.
*C08F 10/10* (2006.01)
(52) U.S. Cl.
CPC ...................... *C08F 10/10* (2013.01)
(58) Field of Classification Search
CPC ....... C08F 110/10; C08F 10/10; C08F 210/10
See application file for complete search history.

(56) References Cited

U.S. PATENT DOCUMENTS

| 5,350,726 A * | 9/1994 | Shaffer ................ B01J 31/0212 502/150 |
| 5,408,018 A | 4/1995 | Rath |
| 2006/0089467 A1* | 4/2006 | McDonald ................ C08F 2/06 526/124.3 |

FOREIGN PATENT DOCUMENTS

| DE | 27 02 604 A1 | 7/1978 |
| EP | 0 145 235 A1 | 6/1985 |
| GB | 1 419 383 | 12/1975 |
| WO | WO 99/64482 A1 | 12/1999 |
| WO | WO 2011/101281 A1 | 8/2011 |
| WO | WO 2017/140603 A1 | 8/2017 |

OTHER PUBLICATIONS

Extended European Search Report dated Mar. 21, 2018 in European Patent Application No. 17186534.8, 3 pages.
Shiman, et al., "Cationic polymerization of isobutylene by AlCl3/ether complexes in non-polar solvents: Effect of ether structure on the selectivity of β-H elimination", Polymer, vol. 54, Issue 9, Apr. 19, 2013, pp. 2235-2242.
Kostjuk, et al., "Novel initiating system based on AlCl3 etherate for quasiliving cationic polymerization of styrene", Polymer Bulletin, vol. 52, Issue 3-4, Oct. 2004, pp. 227-234.
Burrington, et al., "Cationic Polymerization Using Heteropolyacid Salt Catalysts", Topics in Catalysis, vol. 23, Issue 1-4, Aug. 2003, pp. 175-181.
"Vinyl and Diene Monomers", High Polymers, ed. Edward C. Leonard, vol. 24, Issue 2, 1971, pp. 713-733 with cover page.
International Search Report dated Sep. 20, 2018 in PCT/EP2018/071355 filed on Aug. 7, 2018.
Shiman, D. I. et al., "Cationic Polymerization of Isobutylene by Complexes of Alkylaluminum Dichlorides with Diisopropyl Ether: An Activating Effect of Water," Journal of Polymer Science, Part A: Polymer Chemistry, vol. 52, 2014, pp. 2386-2393.

\* cited by examiner

*Primary Examiner* — Catherine S Branch
(74) *Attorney, Agent, or Firm* — Grüneberg and Myers PLLC (57) ABSTRACT

The present invention relates to a novel process for preparing high-reactivity isobutene homo- or copolymers with a content of terminal vinylidene double bonds per polyisobutene chain end of at least 70 mol %. The present invention further relates to novel isobutene polymers.

17 Claims, 1 Drawing Sheet

PROCESS FOR PREPARING HIGH-REACTIVITY ISOBUTENE HOMO- OR COPOLYMERS

BACKGROUND OF THE INVENTION

Field of the Invention

The present invention relates to a novel process for preparing high-reactivity isobutene homo- or copolymers with a content of terminal vinylidene double bonds per polyisobutene chain end of at least 70 mol %. The present invention further relates to novel isobutene polymers.

DESCRIPTION OF RELATED ART

In contrast to so-called low-reactivity polymers, high-reactivity isobutene homo- or copolymers are understood to mean those polyisobutenes which comprise a high content of terminal ethylenic double bonds (α-double bonds) and other reactive double bonds susceptible to subsequent reactions, such as Alder-Ene-reaction with maleic acid anhydride, specifically in practice usually of at least 70, preferably at least 75 and very preferably at least 80 mol %, based on the individual chain ends of the polyisobutene macromolecules. In the context of the present application, vinylidene groups are understood to mean those terminal ethylenic double bonds whose position in the polyisobutene macromolecule is described by the general formula i.e. the double bond is present in an α position in the polymer chain. "Polymer" represents the polyisobutene radical shortened by one isobutene unit. The vinylidene groups exhibit the highest reactivity, for example in the thermal addition onto sterically demanding reactants such as maleic anhydride, whereas a double bond further toward the interior of the macromolecules in most cases exhibits lower reactivity, if any, in functionalization reactions. The uses of high-reactivity polyisobutenes include use as intermediates for preparing additives for lubricants and fuels, as described, for example, in DE-A 27 02 604.

Such high-reactivity polyisobutenes are obtainable, for example, by the process of DE-A 27 02 604 by cationic polymerization of isobutene in the liquid phase in the presence of boron trifluoride as a catalyst. A disadvantage here is that the polyisobutenes obtained have a relatively high polydispersity. The polydispersity is a measure of the molecular weight distribution of the resulting polymer chains and corresponds to the quotient of weight-average molecular weight $M_w$ and number-average molecular weight $M_n$ ($PDI=M_w/M_n$).

Polyisobutenes with a similarly high proportion of terminal double bonds but with a narrower molecular weight distribution are, for example, obtainable by the process of EP-A 145 235, U.S. Pat. No. 5,408,018 and WO 99/64482, the polymerization being effected in the presence of a deactivated catalyst, for example of a complex of boron trifluoride with alcohols and/or ethers.

It has additionally been known for some time that the Lewis acid aluminum trichloride can also be used as a polymerization catalyst for isobutene, for example from High Polymers, volume XXIV (part 2), p. 713-733 (editor: Edward C. Leonard), J. Wiley & Sons publishers, New York, 1971.

In the literature article "Cationic polymerization using heteropolyacid salt catalysts" in Topics in Catalysis Vol. 23, p. 175-181 (2003), James D. Burrington et al. indicate that, with aluminum trichloride as a polymerization catalyst for isobutene, only low-reactivity polyisobutenes with a low content of terminal vinylidene double bonds (α-double bonds) can be obtained. For instance, table 1 on page 178 of this literature article cites an example of a polyisobutene prepared with $AlCl_3$, which has a number-average molecular weight $M_n$ of 1000-2000, a polydispersity $M_w/M_n$ of 2.5-3.5 and a content of vinylidene isomer (α-double bond) of only 5% (in addition to 65% "tri", 5% "β" and 25% "tetra").

In the literature article "Novel initiating system based on $AlCl_3$ etherate for quasiliving cationic polymerization of styrene" in Polymer Bulletin Vol. 52, p. 227-234 (2004), Sergei V. Kostjuk et al. describe a catalyst system composed of 2-phenyl-2-propanol and an aluminum trichloride/dinbutyl ether complex for polymerization of styrene. 2-Phenyl-2-propanol acts as an initiator for the polymerization but does not significantly form alkoxyaluminum compounds. The polydispersities $M_w/M_n$ of the styrene polymers thus prepared are "~2.5" (see summary) or "~3" (see page 230).

WO 11/101281 disclose the preparation of highly reactive polyisobutene polymers by polymerizing a monomer mixture containing isobutene in the presence of an aluminum trihalogenide donor complex acting as a polymerization catalyst. The donor complex comprises an organic compound having at least one ether function or a carboxylic acid function as the donor.

However, a disadvantage of $AlCl_3$ is its low solubility in organic aprotic solvents which requires the use of halogenated solvents such as methylene chloride or chloroform as solvent. Therefore, a catalyst is needed with improved solubility in organich solvents, especially halide-free solvents such as toluene or alkanes, such as pentane-, hexane- or heptane-isomers.

Dmitriy I. Shiman, Irina V. Vasilenko, Sergei V. Kostjuk, Journal of Polymer Science, Part A: Polymer Chemistry 2014, 52, 2386-2393 disclose the preparation of polyisobutene polymers by polymerizing isobutene in the presence of an alkylaluminum halogenide an ether complex as a polymerization catalyst.

Unpublished International Application PCT/EP2017/053098, filed Feb. 13, 2017, discloses the preparation of highly reactive polyisobutene polymers with narrow polydispersity by polymerizing a monomer mixture containing isobutene in the presence of a alkylaluminum halide-donor complex, said complex comprising, as the donor, a mixture of at least two organic compounds with at least one ether function each.

SUMMARY OF THE INVENTION

It was an object of the present invention to provide a process for preparing high-reactivity isobutene homo- or copolymers with an increased content of terminal vinylidene double bonds per polyisobutene chain end of at least 70 mol % and simultaneously with a narrow molecular weight distribution (i.e. low polydispersities) in acceptable yields without the necessity to use mixtures of different donors. The catalyst system should at the same time have sufficient activity and service life, the handling thereof should be unproblematic and it should not be prone to failure.

The object was achieved by a process for preparing high-reactivity isobutene homo- or copolymers with a content of terminal vinylidene double bonds per polyisobutene chain end of at least 70, preferably at least 75 and very preferably at least 80 mol %, which comprises polymerizing isobutene or an isobutene-comprising monomer mixture in the presence of a hydrocarbyloxy aluminum compound $Al(OR^a)_p(R^b)_qX_r$, or mixtures thereof, wherein $R^a$ and $R^b$ independently of another represent an organic residue of up to 20 carbon atoms, preferably $C_1$- to $C_{20}$aralkyl, $C_5$- to $C_8$-cycloalkyl radical, $C_6$- to $C_{20}$-aryl radical or $C_7$- to $C_{20}$-arylalkyl radical, X independently of another represents halide, p independently of another represents a rational number of greater than 0 (zero) and less than 3, q independently of another represents a rational number of at least 0 (zero) and less than 3, and r independently of another represents a rational number of at least 0 (zero) and less than 3, with the proviso that the sum of (p+q+r) is always 3, effective as a polymerization catalyst, optionally in the presence of at least one donor compound.

DETAILED DESCRIPTION OF THE INVENTION

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise less than 2 mol %, preferably less than 1 mol %, very preferably less than 0.7 mol % and especially less than 0.5 mol % of copolymerized monomers other than isobutene, for example isoprene or linear butenes, preferably 1-butene, cis-2-butene, and trans-2-butene.

In the context of the present invention, the following definitions apply to generically defined radicals:

A $C_1$- to $C_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1methylbutyl, 2-methylbutyl, 3-methylbutyl, 2,2-dimethyl-propyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such $C_1$- to $C_8$-alkyl radicals may to a small extent also comprise heteroatoms such as oxygen, nitrogen or halogen atoms, for example chlorine, and/or aprotic functional groups, for example carboxyl ester groups, cyano groups or nitro groups. However, radicals purely consisting of carbon and hydrogen are preferred.

A $C_1$- to $C_4$-alkyl radical is methyl, ethyl, n-propyl, isopropyl, n-butyl, 2-butyl, isobutyl or tertbutyl.

A $C_1$- to $C_{20}$-alkyl radical is a linear or branched alkyl radical having 1 to 20 carbon atoms. Examples thereof are the abovementioned $C_1$- to $C_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such $C_1$- to $C_{20}$-alkyl radicals may to a small extent also comprise heteroatoms such as oxygen, nitrogen or halogen atoms, for example chlorine, and/or aprotic functional groups, for example carboxyl ester groups, cyano groups or nitro groups. However, radicals purely consisting of carbon and hydrogen are preferred.

A $C_5$- to $C_8$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl. Such $C_5$- to $C_8$-cycloalkyl radicals may to a small extent also comprise heteroatoms such as oxygen, nitrogen or halogen atoms, for example chlorine, and/or aprotic functional groups, for example carboxyl ester groups, cyano groups or nitro groups. However, radicals purely consisting of carbon and hydrogen are preferred.

A $C_6$- to $C_{20}$-aryl radical or a $C_6$- to $C_{12}$-aryl radical is preferably optionally substituted phenyl, optionally substituted naphthyl, optionally substituted anthracenyl or optionally substituted phenanthrenyl. Such aryl radicals may be a 1 to 5 aprotic substituents or aprotic functional groups, for example $C_1$- to $C_8$-alkyl, $C_1$- to $C_8$-haloalkyl such as $C_1$- to $C_8$-chloroalkyl or $C_1$- to $C_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chlorophenyl, dichlorophenyl, pentafluorophenyl, pentachlorophenyl, (trifluoromethyl)phenyl, bis(trifluoromethyl)phenyl, (trichloro)methylphenyl and bis(trichloromethyl)phenyl. However, radicals purely consisting of carbon and hydrogen are preferred.

A $C_7$- to $C_{20}$-ararylalkyl radical or a $C_7$- to $C_{12}$-arylalkyl radical is preferably optionally substituted $C_1$- to $C_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted $C_1$- to $C_4$-alkylnaphthyl such as naphthylmethyl, optionally substituted $C_1$- to $C_4$-alkylanthracenyl such as anthracenylmethyl, or optionally substituted $C_1$- to $C_4$-alkylphenanthrenyl such as phenanthrenylmethyl. Such arylalkyl radicals may bear 1 to 5 aprotic substituents or aprotic functional groups, especially on the aryl moiety, for example $C_1$- to $C_8$-alkyl, $C_1$- to $C_8$-haloalkyl such as $C_1$- to $C_8$-chloroalkyl or $C_1$- to $C_8$-fluoroalkyl, halogen such as chlorine or fluorine, nitro or phenyl. However, radicals purely consisting of carbon and hydrogen are preferred.

Halide is fluoride, chloride, bromide or iodide, preferably fluoride, chloride or bromide, very preferably chloride or bromide and especially chloride.

In a preferred embodiment the hydrocarbyloxy aluminum compounds are used as mixtures of at least two of the above-mentioned compounds.

Among the hydrocarbyloxy residues $C_1$- to $C_{20}$-alkyloxy and $C_6$- to $C_{20}$-aryloxy radicals are preferred, and $C_1$- to $C_8$-alkyloxy and $C_6$- to $C_{12}$-aryloxy radicals are more preferred, with $C_1$- to $C_4$-alkyloxy groups being most preferred. Alkyl groups are preferred over aryl groups.

Among the alkyl groups $C_1$- to $C_8$-alkyl groups are more preferred and $C_1$- to $C_4$-alkyl goups most preferred.

Among the halides X fluoride, chloride, and bromide are preferred, chloride and bromide more preferred and chloride is most preferred.

Preferred organic residues $R^a$ are methyl, ethyl, n-propyl, iso-propyl, n-butyl, tert-butyl, and phenyl, very preferred are iso-propyl, n-butyl, and tert-butyl.

Preferred organic residues $R^b$ are methyl, ethyl, n-propyl, iso-propyl, n-butyl, and iso-butyl, very preferred are ethyl and iso-butyl.

Useful hydrocarbyloxy aluminum compounds are
bis (hydrocarbyloxy) aluminum mono halides,
mono (hydrocarbyloxy) aluminum dihalides,
mono hydrocarbyloxy mono alkyl aluminum halides,
bis (hydrocarbyloxy) mono alkyl aluminum compounds,
mono (hydrocarbyloxy) bis alkyl aluminum compounds,
and mixtures thereof.

In case of mixtures of compounds $Al(OR^a)_p(R^b)_qX_r$ the values of p, q, and r may represent rational numbers for the mixtures, for each individual compound the values of p, q, and r are integer.

Preferably p is from 0.5 to 1.5, very preferably from 0.7 to 1.3 and especially from 0.8 to 1.2.

Preferably q is not more than 2, very preferably not more than 1, and r is always 3-p-q.

In a preferred embodiment q is 0 (zero). In this case very preferred hydrocarbyloxy aluminum compounds are $Al(OR^a)_{0.7-1-2}X_{1.8-2.3}$.

According to the invention the hydrocarbyloxy aluminum compound or mixtures thereof effective as a polymerization catalyst preferably comprises at least one donor compound.

Donor compounds are organic compounds comprising at least one oxygen or nitrogen atom with at least one non-binding electron pair, preferably at least one oxygen atom, very preferably exactly one oxygen atom.

The donor is preferably selected from the group consisting of ethers, hydrocarbyl carboxylates, ethers, alcohols, aldehyde, ketones, and phenols.

Alcohols or phenols as donors or initiators, especially 2-phenyl-2-propanol described in Sergei V. Kostjuk et al., Polymer Bulletin Vol. 52, p. 227-234 (2004), together with aluminum halides, especially $AlCl_3$, do not form the hydrocarbyloxy aluminum compounds effective as catalysts according to the present invention but in contrast yield ion pairs according to the formula as follows:

CumOH+AlCl$_3$→Cum$^+$AlCl$_3$(OH)$^-$

With CumOH=2-phenyl-2-propanol.

For the sake of clarity, the catalysts according to the present invention are preferably free of any additional Brønsted acids, very preferably free of any hydrogen halide acids of the halide used as aluminum halide in the reaction, and especially free of hydrogen chloride.

Ethers as donors preferably mean dihydrocarbyl ethers of the general formula $R^1$—O—$R^2$ in which the variables $R^1$ and $R^2$ are each independently $C_1$- to $C_{20}$-alkyl radicals, preferably $C_1$- to $C_8$ alkyl radicals especially $C_1$- to $C_4$ alkyl radicals, $C_5$- to $C_8$-cycloalkyl radicals, preferably $C_5$- to $C_6$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals. Furthermore, $C_1$- to $C_8$ haloalkyl radicals, preferably $C_1$- to $C_8$ chloroalkyl radicals are possible. Preference is given $C_1$- to $C_4$ alkyl radicals, $C_6$- to $C_{12}$ aryl radicals, and $C_7$- to $C_{12}$-arylalkyl radicals.

The dihydrocarbyl ethers mentioned may be open-chain or cyclic, where the two variables $R^1$ and $R^2$ in the case of the cyclic ethers may join to form a ring, where such rings may also comprise two or three ether oxygen atoms.

Examples of such open-chain and cyclic dihydrocarbyl ethers are dimethyl ether, diethyl ether, di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl) ether, methyl n-butyl ether, methyl sec-butyl ether, methyl isobutyl ether, methyl tert-butyl ether, ethyl n-butyl ether, ethyl sec-butyl ether, ethyl isobutyl ether, ethyl tert-butyl ether, n-propyl-n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, alkyl aryl ethers, such as anisole and phenetole, ditolyl ether, dixylyl ether and dibenzyl ether. Furthermore, bis (2-chloroethyl) ether, 2-chloroethyl ethyl ether, 2-chloroethyl methyl ether, chloromethyl methyl ether, and chloromethyl ethyl ether are possible.

Furthermore, difunctional ethers such as dialkoxybenzenes, preferably dimethoxybenzenes, very preferably veratrol, and ethylene glycol dialkylethers, preferably ethylene glycol di-methylether and ethylene glycol diethylether, are preferred.

Among the dihydrocarbyl ethers mentioned, diethyl ether, diisopropyl ether, di-n-butyl ether and diphenyl ether have been found to be particularly advantageous as donors for the hydrocarbyloxy aluminum compound-donor complexes or mixtures of hydrocarbyloxy aluminum compounds-donor complexes.

In a further embodiment a mixture of dihydrocarbyl ethers comprises at least one ether with primary dihydrocarbyl groups and at least one ether with at least one secondary or tertary dihydrocarbyl group. Ethers with primary dihydrocarbyl groups are those ethers in which both dihydrocarbyl groups are bound to the ether functional group with a primary carbon atom, whereas ethers with at least one secondary or tertary dihydrocarbyl group are those ethers in which at least one dihydrocarbyl group is bound to the ether functional group with a secondary or tertiary carbon atom.

For the sake of clarity, e.g. diisobutyl ether is deemed to be an ether with primary dihydrocarbyl groups, since the secondary carbon atom of the isobutyl group is not bound to the oxygen of the functional ether group but the hydrocarbyl group is bound via a primary carbon atom.

Preferred examples for ethers with primary dihydrocarbyl groups are diethyl ether, di-n-butyl ether, and di-n-propyl ether.

Preferred examples for ethers with at least one secondary or tertary dihydrocarbyl group are diisopropyl ether, methyl tert-butyl ether, ethyl tert-butyl ether, and anisole.

Preferred mixtures of ethers acording to the invention are diethyl ether/diisopropyl ether, diethyl ether/methyl tert-butyl ether, diethyl ether/ethyl tert-butyl ether, di-n-butyl ether/diisopropyl ether, di-n-butyl ether/methyl tert-butyl ether, and di-n-butyl ether/ethyl tert-butyl ether. Very preferred mixtures are diethyl ether/diisopropyl ether, di-n-butyl ether/diisopropyl ether, diethyl ether/methyl tert-butyl ether, and di-n-butyl ether/ethyl tert-butyl ether, the mixture of diethyl ether/diisopropyl ether being especially preferred.

In a further embodiment of the present invention, as an alternative, a hydrocarbyloxy aluminum compound-donor complex, is used, which comprises, as the donor, a hydrocarbyl carboxylate of the general formula $R^3$—COOR$^4$ in which the variables $R^3$ and $R^4$ are each independently $C_1$- to $C_{20}$-alkyl radicals, preferably $C_1$- to $C_8$ alkyl radicals, especially $C_1$- to $C_4$ alkyl radicals, $C_5$- to $C_8$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals.

Examples of the hydrocarbyl carboxylates mentioned are methyl formate, ethyl formate, n-propyl formate, isopropyl formate, n-butyl formate, sec-butyl formate, isobutyl formate, tert-butyl formate, methyl acetate, ethyl acetate, n-propyl acetate, isopropyl acetate, n-butyl acetate, sec-butyl acetate, isobutyl acetate, tert-butyl acetate, methyl propionate, ethyl propionate, n-propyl propionate, isopropyl propionate, n-butyl propionate, sec-butyl propionate, isobutyl propionate, tert-butyl propionate, methyl butyrate, ethyl butyrate, n-propyl butyrate, isopropyl butyrate, n-butyl butyrate, sec-butyl butyrate, isobutyl butyrate, tert-butyl butyrate, methyl cyclohexanecarboxylate, ethyl cyclohexanecarboxylate, n-propyl cyclohexanecarboxylate, isopropyl cyclohexanecarboxylate, n-butyl cyclohexanecarboxylate, sec-butyl cyclohexanecarboxylate, isobutyl cyclohexanecarboxylate, tert-butyl cyclohexanecarboxylate, methyl benzoate, ethyl benzoate, n-propyl benzoate, isopropyl benzoate, n-butyl benzoate, sec-butyl benzoate, isobutyl benzoate, tert-butyl benzoate, methyl phenylacetate, ethyl phenylacetate, n-propyl phenylacetate, isopropyl phenylacetate, n-butyl phenylacetate, sec-butyl phenylacetate, isobutyl phenylacetate and tert-butyl phenylacetate.

It is also possible to use polyfunctional hydrocarbyl carboxylates, e.g. hydrocarbyl esters of di- or polycarboxylic acids or di- or polyfunctional alcohols esterified with monofunctional carboxylic acids.

Examples of the former are $C_1$- to $C_{20}$-alkyl esters, especially $C_1$- to $C_8$ alkyl esters of oxalic acid, malonic acid, succinic acid, glutaric acid, adipic acid, heptanedioic acid, nonanedioic acid, decanedioic acid, maleic acid, fumaric acid, phthalic acid, terephthalic acid, and iso-phthalic acid.

Examples of the latter are formates, acetates, propionates, butyrates, and benzoates of 1,2-ethylenglycol, 1,2-propylenglycol, 1,3-propylenglycol, 1,2-butylenglycol, 1,3-butylenglycol, 1,4-butylenglycol, 1,5-pentylenglycol, 1,6-hexylenglycol, 1,8-octylenglycol, 1,10-decylenglycol, glycerol, trimethylolpropane, trimethylolethane, and pentaerythritol.

Among the hydrocarbyl carboxylates mentioned, ethyl acetate has been found to be particularly advantageous as a donor for the hydrocarbyloxy aluminum compound-donor complexes.

In addition, particularly advantageous dihydrocarbyl ethers and hydrocarbyl carboxylates as donors for the hydrocarbyloxy aluminum compound-donor complexes or mixtures of hydrocarbyloxy aluminum compounds-donor complexes, have been found to be those in which the donor compound has a total carbon number of 3 to 16, preferably of 4 to 16, especially of 4 to 12, in particular of 4 to 8. In the specific case of the dihydrocarbyl ethers, preference is given in particular to those having a total of 6 to 14 and especially 8 to 12 carbon atoms. In the specific case of the hydrocarbyl carboxylates, preference is given in particular to those having a total of 3 to 10 and especially 4 to 6 carbon atoms.

Alcohols as donors preferably are $C_1$-$C_{12}$-hydrocarbyl alcohols and preferably have only one hydroxyl group per molecule. Particularly suitable $C_1$-$C_{12}$-hydrocarbyl alcohols are linear or branched $C_1$-$C_{12}$-alkanols, preferably linear or branched $C_1$-$C_8$-alkanols, very preferably linear or branched $C_1$-$C_6$-alkanols, especially linear or branched $C_1$-$C_4$-alkanols, $C_5$-$C_{12}$-cycloalkanols and $C_7$-$C_{12}$-aryl alkanols. Typical examples of such compounds are methanol, ethanol, n-propanol, isopropanol, n-butanol, isobutanol, sec-butanol, tert-butanol, n-pentanol, sec-pentanol, tert-pentanol, n-hexanol, n-heptanol, n-octanol, 2-ethylhexanol, n-nonanol, n-decanol, 2-propylheptanol, n-undecanol, n-dodecanol, cyclopentanol, cyclohexanol, 2-, 3- or 4-methylcyclohexanol, cycloheptanol, benzyl alcohol, 1- or 2-phenylethanol, 1-, 2- or 3-phenylpropanol, 1-, 2-, 3- or 4-phenylbutanol, (o-, m- or p-methylphenyl)methanol, 1,2-ethylene glycol, 1,3-propylene glycol, 1,2,3-propanetriol (glycerol), 1,2-ethylene glycol monomethyl ether, 1,2-ethylene glycol monoethyl ether, 1,3-propylene glycol monomethyl ether and 1,3-propylene glycol monoethyl ether. It is also possible to use mixtures of various $C_1$-$C_{12}$-hydrocarbyl alcohols of this type.

Particular preference is given to using branched and in particular linear $C_1$-$C_{12}$-alkanols, preferably linear or branched $C_1$-$C_8$-alkanols, very preferably linear or branched $C_1$-$C_6$-alkanols, especially linear or branched $C_1$-$C_4$-alkanols.

Aldehydes and ketones as donors having from 1 to 12 carbon atoms can be aliphatic, cycloaliphatic or aromatic in nature. They generally comprise, apart from the aldehyde or ketone function, a pure hydrocarbon framework and thus have predominantly hydrocarbon character. However, they can also comprise, to a small extent, heteroatoms such as nitrogen or oxygen or further functional groups which are inert toward hydroxyl groups.

Typical examples of such aldehydes and ketones are formaldehyde, acetaldehyde, propionaldehyde, butyraldehyde, n-pentanal, n-hexanal, n-octanal, n-decanal, n-dodecanal, cyclopentyl carbaldehyde, cyclohexyl carbaldehylde, benzaldehyde, phenylacetaldehyde, 2- or 3-phenylpropionaldehyde, 2-, 3- or 4-phenylbutyraldehyde, acetone, butanone, 2- or 3-pentanone, cyclopentanone, cyclohexanone and acetophenone. It is also possible to use mixtures of various aldehydes of this type or various ketones of this type.

As aldehydes and ketones having from 1 to 12 carbon atoms, particular preference is given to using aldehydes and ketones having from 1 to 4 carbon atoms, especially aldehydes having from 1 to 4 carbon atoms.

Hemiacetals as donors can be obtained by reaction of equimolar amounts of hydrocarbyl alcohol and aldehyde or ketone, preferably the above-mentioned alcohols and aldehydes or ketones. The full acetals used can be obtained by reaction of two equivalents of hydrocarbyl alcohol with one equivalent of aldehyde or ketone, preferably the above-mentioned alcohols and aldehydes or ketones. It is also possible to use mixtures of hemiacetals and full acetals. The corresponding hemiacetals and full acetals are generally in chemical equilibrium with one another.

To form hemiacetals and full acetals from hydrocarbyl alcohols and aldehydes or ketones, the presence of protic acids which makes the addition of the alcohol oxygen onto the carbonyl function to form the hemiacetal and in the second step the addition of the second alcohol molecule and the elimination of water to form the full acetal possible is necessary. Catalytic amounts of protic acids are usually sufficient. Typical protic aids here are inorganic acids such as hydrochloric acid or dilute sulfuric acid or organic acids such as carboxylic acids, for example acetic acid, trichloroacetic acid or trifluoroacetic acid, or sulfonic acids, for example methanesulfonic acid or toluenesulfonic acid.

Very particular preference is given to formaldehyde which can be used in monomeric form, for example in the form of its concentrated aqueous solution, or else as trioxane or as paraformaldehyde for the protic acid-catalyzed reaction with at least one $C_1$-$C_{12}$-hydrocarbyl alcohol to form the hemiacetals or full acetals.

The structure of such hemiacetals and full acetals is shown by the following general formula (I):

(I)

where the variables $R^{15}$ and $R^{16}$ are, independently of one another, hydrogen, $C_1$-$C_{12}$-alkyl radicals, preferably $C_1$-$C_8$-alkyl radicals, $C_5$-$C_{12}$-cycloalkyl radicals or $C_7$-$C_{12}$-arylalkyl radicals, where the two variables $R^{15}$ and $R^{16}$ can also form a ring and the sum of the carbon atoms in the two variables $R^{15}$ and $R^{16}$ has to be from 1 to 12, the variable $R^{17}$ is hydrogen (in the case of hemiacetals) or in the case of acetals a $C_1$-$C_{12}$-alkyl radical, a $C_5$-$C_{12}$-cycloalkyl radical or a $C_7$-$C_{12}$-arylalkyl radical and the variable $R^{18}$ is a $C_1$-$C_{12}$-alkyl radical, a $C_5$-$C_{12}$-cycloalkyl radical or a $C_7$-$C_{12}$-arylalkyl radical.

Typical individual examples of such hemiacetals and full acetals are the hemiacetal of methanol and formaldehyde, the full acetal of methanol and formaldehyde, the hemiacetal of ethanol and formaldehyde, the full acetal of ethanol and formaldehyde the hemiacetal of n-propanol and formaldehyde, the full acetal of n-propanol and formaldehyde, the hemiacetal of n-butanol and formaldehyde, the full acetal of n-butanol and formaldehyde, the hemiacetal of methanol and acetaldehyde, the full acetal of methanol and acetaldehyde, the hemiacetal of ethanol and acetaldehyde, the full acetal of ethanol and acetaldehyde, the hemiacetal of n-propanol and acetaldehyde, the full acetal of n-propanol and acetaldehyde, the hemiacetal of n-butanol and acetaldehyde and the full acetal of n-butanol and acetaldehyde.

Examples of phenols as donors are substituted or unsibstituted phenols and naphthols, preferably phenols.

Very preferred examples of phenols are those of formula wherein $R^{19}$, $R^{20}$ and $R^{21}$ independently of another are hydrogen or $C_1$- to $C_{20}$-alkyl, preferably $C_1$- to $C_8$-alkyl, very preferably $C_1$- to $C_4$-alkyl.

Preferably $R^{19}$, $R^{20}$ and $R^{21}$ independently of another are hydrogen, methyl, ethyl, iso-propyl, sec-butyl and tert-butyl, very preferably hydrogen, methyl and tert-butyl.

Preferred phenols are phenol, 2-methyl phenol, 2-tert-butyl phenol, 2-methyl-4-tert-butyl phenol, and 4-methyl-2,6-di-tert-butyl phenol.

Preferred donor compounds are ethers, alcohols, ketones, and phenols, more preferred are ethers, ketones, and phenols, and most preferred are ethers.

The molar ratio of the donor compounds mentioned to the hydrocarbyloxyaluminum compound in the donor complex generally varies within the range from 0.2:1 to 1.5:1, especially from 0.3:1 to 1.2:1, in particular 0.4:1 to 1.1:1; in most cases it is 0.4:1 to 1:1. However, it is also possible to work with a greater excess of the donor compounds, often up to a 10-fold and especially 3-fold molar excess; the excess amount of donor compounds then acts additionally as a solvent or diluent.

The molar ratio of the ether compounds in a binary mixture generally varies from 0.1:1 to 1:0.1, preferably from 0.2:1 to 1:0.2, very preferably from 0.3:1 to 1:0.3, more preferably from 0.5:1 to 1:0.5, especially from 0.66:1 to 1:0.66, and even from 0.9:1 to 1:0.9. In a preferable embodiment the ether compounds are present in an equimolar molar ratio.

The molar ratio of the hydrocarbyloxy aluminum compound or mixtures thereof or hydrocarbyloxy aluminum compound-donor complex to the isobutene monomer used in the case of homopolymerization of isobutene, or to the total amount of the polymerizable monomers used in the case of copolymerization of isobutene, based on each individual functional site of the hydrocarbyloxy aluminum compound or hydrocarbyloxy aluminum compounds or hydrocarbyloxy aluminum compound-donor complex, is generally from 0.001:1 to 0.2:1, preferably 0.002:1 to 0.1:1, very preferably 0.003:1 to 0.08:1, especially 0.005:1 to 0.05:1, and in particular 0.007:1 to 0.03:1.

Typically, the hydrocarbyloxy aluminum compounds or the hydrocarbyloxy aluminum compound-donor complex, is prepared separately prior to the polymerization from the aluminum trihalide or the alkylaluminum dihalide or the dialkylaluminum halide, especially from anhydrous aluminum trichloride, alkyl aluminum dichloride or an dialkyl aluminum chloride, and the tris hydrocarbyloxy aluminum compound $Al(OR^a)_3$ in stochiometric amounts representing p, q, and r, and is then—usually dissolved in an inert solvent such as a halogenated hydrocarbon, for example dichloromethane, or more preferably in unhalogenated hydrocarbons—added to the polymerization medium. However, the complex can also be prepared in situ prior to the polymerization.

Preferably the thus obtainable hydrocarbyloxy aluminum compound or mixtures thereof are then mixed with the respective donor compound or compounds and added to the polymerization medium. However, the complex can also be prepared in situ prior to the polymerization.

It is an advantage of the hydrocarbyloxy aluminum compound or mixtures thereof or their donor complexes that they exhibit a better solubility in hydrocarbon solvents, especially in toluene than $AlCl_3$. Hence it is possible to avoid or significantly reduce the use of halogenated solvents for dissolving the catalyst.

In a preferred embodiment of the present invention, the polymerization is performed with additional use of a mono- or polyfunctional, especially mono-, di- or trifunctional, initiator which is selected from organic hydroxyl compounds, organic halogen compounds and water. It is also possible to use mixtures of the initiators mentioned, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water, or mixtures of one or more organic halogen compounds and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^5$—OH, in which $R^5$ denotes $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. In addition, the $R^5$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxyl compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxyphenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1-propanol, 1- and 2-phenyl-2-propanol, 1- and 2-(p-methoxyphenyl)-2-propanol, 1-, 2-, 3- and 4-phenyl-1-butanol, 1-, 2-, 3-and 4-(p-methoxyphenyl)-1-butanol, 1-, 2-, 3- and 4-phenyl-2-butanol, 1-, 2-, 3- and 4-(p-methoxyphenyl)-2-butanol, 9-methyl-9H-fluoren-9-ol, 1,1-diphenylethanol, 1,1-diphenyl-2-propyn-1-ol, 1,1-diphenylpropanol, 4-(1-hydroxy-1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl) methanol, alpha,alpha-diphenyl-2-pyridinemethanol, 4-methoxytrityl alcohol (especially polymer-bound as a solid phase), alpha-tert-butyl-4-chloro-4'-methylbenzhydrol, cyclohexyldiphenylmethanol, alpha-(p-tolyl)-benzhydrol, 1,1,2-triphenylethanol, alpha,alpha-diphenyl-2-pyridineethanol, alpha,alpha-4-pyridylbenzhydrol N-oxide, 2-fluorotriphenylmethanol, triphenylpropargyl alcohol, 4-[diphenyl)hydroxymethyl]penzonitrile, 1-(2,6-dimethoxyphenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2-and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)phenyl]-9-fluorenol.

Organic halogen compounds which have one halogen atom in the molecule and are suitable as monofunctional initiators are in particular compounds of the general formula $R^6$-Hal in which Hal is a halogen atom selected from fluorine, iodine and especially chlorine and bromine, and $R^6$ denotes $C_1$- to $C_{20}$-alkyl radicals, especially $C_1$- to $C_8$-alkyl radicals, $C_5$- to $C_8$-cycloalkyl radicals or $C_7$- to $C_{20}$-arylalkyl radicals, especially $C_1$- to $C_{12}$-arylalkyl radicals. In addition, the $R^6$ radicals may also comprise mixtures of the abovementioned structures and/or have other functional groups than those already mentioned, for example a keto function, a nitroxide or a carboxyl group, and/or heterocyclic structural elements.

Typical examples of such monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bromooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3-chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl)benzene, 1,3-bis(2-chloro-2-propyl)benzene (1,3-dicumyl chloride) and 1,4-bis(2-chloro-2-propyl)benzene (1,4-dicumyl chloride).

The initiator is more preferably selected from organic hydroxyl compounds in which one or more hydroxyl groups are each bonded to an spa-hybridized carbon atom, organic halogen compounds, in which one or more halogen atoms are each bonded to an spa-hybridized carbon atom, and water. Among these, preference is given in particular to an initiator selected from organic hydroxyl compounds in which one or more hydroxyl groups are each bonded to an $sp^3$-hybridized carbon atom.

In the case of the organic halogen compounds as initiators, particular preference is further given to those in which the one or more halogen atoms are each bonded to a secondary or especially to a tertiary spa-hybridized carbon atom.

Preference is given in particular to initiators which may bear, on such an spa-hybridized carbon atom, in addition to the hydroxyl group, the $R^5$, $R^6$ and $R^7$ radicals, which are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents, where not more than one of the variables $R^5$, $R^6$ and $R^7$ is hydrogen and at least one of the variables $R^5$, $R^6$ and $R^7$ is phenyl which may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents.

For the present invention, very particular preference is given to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene. Among these, preference is given in particular to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane and 1,3- or 1,4-bis(1-hydroxy-1-methylethyl)benzene.

The molar ratio of the initiators mentioned to the isobutene monomer used in the case of homo-polymerization of isobutene, or to the total amount of the polymerizable monomers used in the case of copolymerization of isobutene, based on each individual functional site of the initiator, is generally from 0.0005:1 to 0.1:1, especially 0.001:1 to 0.075:1, in particular 0.0025:1 to 0.05:1. When water is used as the sole initiator or in combination with organic hydroxyl compounds and/or organic halogen compounds as further initiators, the molar ratio of water to the isobutene monomer used in the case of homopolymerization of isobutene, or to the total amount of the polymerizable monomers used in the case of copolymerization of isobutene, is especially from 0.0001:1 to 0.1:1, in particular 0.0002:1 to 0.05:1, preferably 0.0008:1 to 0.04:1, and very preferably in particular 0.001:1 to 0.03:1.

A proportion of the initiator molecules added as organic hydroxyl or halogen compounds is incorporated into the polymer chains. The proportion ($l_{eff}$) of polymer chains which are started by such an incorporated organic initiator molecule may be up to 100%, and is generally 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a nitrogen-containing basic compound.

Such a less preferred nitrogen-containing basic compound used may be an aliphatic, cycloaliphatic or aromatic amine of the general formula $R^7-NR^8R^9$, or else ammonia, in which the variables $R^7$, $R^8$ and $R^9$ are each independently hydrogen, $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^7-NR^8R^9$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tertamylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, tri-isobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a nitrogen-containing basic compound used may also be a compound having a plurality of, especially having two or three, nitrogen atoms and having 2 to 20 carbon atoms, where these nitrogens may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl-1,2-ethylenediamine, N,N'-dimethyl-1,2-ethylenediamine or N,N-dimethyl-1,3-propylenediamine.

However, a suitable nitrogen-containing basic compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable nitrogen-containing basic compound of this kind is pyridine or a derivative of pyridine (especially a mono-, di- or tri-$C_1$- to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3,- or 4-tert-butylpyridine, 2-tert-butyl-6methylpyridine, 2,4-, 2,5-, 2,6- or 3,5-di-tert-butylpyridine or else 2-, 3,- or 4-phenylpyridine.

It is possible to use a single nitrogen-containing basic compound or mixtures of such nitrogen-containing basic compounds.

For the use of isobutene or of an isobutene-comprising monomer mixture as the monomer to be polymerized, suitable isobutene sources are both pure isobutene and isobutenic $C_4$ hydrocarbon streams, for example $C_4$ raffinates, especially "raffinate 1", $C_4$ cuts from isobutane dehydrogenation, $C_4$ cuts from steam crackers and from FCC crackers (fluid catalyzed cracking), provided that they have been substantially freed of 1,3-butadiene present therein. A $C_4$ hydrocarbon stream from an FCC refinery unit is also known as "b/b" stream. Further suitable isobutenic $C_4$ hydrocarbon streams are, for example, the product stream of a propylene-isobutane cooxidation or the product stream from a metathesis unit, which are generally used after customary purification and/or concentration. Suitable $C_4$ hydrocarbon streams generally comprise less than 500 ppm, preferably less than 200 ppm, of butadiene. The presence of 1-butene and of cis- and trans-2-butene is substantially uncritical. Typically, the isobutene concentration in the $C_4$ hydrocarbon streams mentioned is in the range from 40 to 60% by weight. For instance, raffinate 1 generally consists essentially of 30 to 50% by weight of isobutene, 10 to 50% by weight of 1-butene, 10 to 40% by weight of cis- and trans-2-butene, and 2 to 35% by weight of butanes; in the polymerization process according to the invention, the unbranched butenes in the raffinate 1 generally behave virtually inertly, and only the isobutene is polymerized.

In a preferred embodiment, the monomer source used for the polymerization is a technical $C_4$ hydrocarbon stream with an isobutene content of 1 to 100% by weight, especially of 1 to 99% by weight, in particular of 1 to 90% by weight, more preferably of 30 to 60% by weight, especially a raffinate 1 stream, a b/b stream from an FCC refinery unit, a product stream from a propylene-isobutane cooxidation or a product stream from a metathesis unit.

Especially when a raffinate 1 stream is used as the isobutene source, the use of water as the sole initiator or as a further initiator has been found to be useful, in particular when polymerization is effected at temperatures of −20° C. to +30° C., especially of 0° C. to +20° C. At temperatures of −20° C. to +30° C., especially of 0° C. to +20° C., when a raffinate 1 stream is used as the isobutene source, it is, however, also possible to dispense with the use of an initiator.

The isobutenic monomer mixture mentioned may comprise small amounts of contaminants such as water, carboxylic acids or mineral acids, without there being any critical yield or selectivity losses. It is appropriate to prevent enrichment of these impurities by removing such harmful substances from the isobutenic monomer mixture, for example by adsorption on solid adsorbents such as activated carbon, molecular sieves or ion exchangers.

It is also possible to convert monomer mixtures of isobutene or of the isobutenic hydrocarbon mixture with olefinically unsaturated monomers copolymerizable with isobutene. When monomer mixtures of isobutene are to be copolymerized with suitable comonomers, the monomer mixture preferably comprises at least 5% by weight, more preferably at least 10% by weight and especially at least 20% by weight of isobutene, and preferably at most 95% by weight, more preferably at most 90% by weight and especially at most 80% by weight of comonomers.

Useful copolymerizable monomers include: vinylaromatics such as styrene and α-methylstyrene, $C_1$- to $C_4$-alkyl-styrenes such as 2-, 3- and 4-methylstyrene, and 4-tert-butylstyrene, halostyrenes such as 2-, 3- or 4-chlorostyrene, and isoolefins having 5 to 10 carbon atoms, such as 2-methylbutene-1, 2-methylpentene-1, 2-methylhexene-1, 2-ethylpentene-1, 2-ethylhexene-1 and 2-propylheptene-1. Further useful comonomers include olefins which have a silyl group, such as 1-trimethoxysilylethene, 1-(trimethoxysilyl)propene, 1-(trimethoxysilyl)-2-methylpropene-2, 1-[tri(methoxyethoxy)silyl]ethene, 1-[tri(methoxyethoxy)silyl]propene, and 1-[tri(methoxyethoxy)silyl]-2-methylpropene-2. In addition—depending on the polymerization conditions—useful comonomers also include isoprene, 1-butene and cis- and trans-2-butene.

When the process according to the invention is to be used to prepare copolymers, the process can be configured so as to preferentially form random polymers or to preferentially form block copolymers. To prepare block copolymers, for example, the different monomers can be supplied successively to the polymerization reaction, in which case the second comonomer is especially not added until the first comonomer is already at least partly polymerized. In this manner, di-block, triblock and higher block copolymers are obtainable, which, according to the sequence of monomer addition, have a block of one or the other comonomer as a terminal block. In some cases, however, block copolymers also form when all comonomers are supplied to the polymerization reaction simultaneously, but one of them polymerizes significantly more rapidly than the other(s). This is the case especially when isobutene and a vinylaromatic compound, especially styrene, are copolymerized in the process according to the invention. This preferably forms block copolymers with a terminal polystyrene block. This is attributable to the fact that the vinylaromatic compound, especially styrene, polymerizes significantly more slowly than isobutene.

The polymerization can be effected either continuously or batchwise. Continuous processes can be performed in analogy to known prior art processes for continuous polymerization of isobutene in the presence of boron trifluoride-based catalysts in the liquid phase.

The process according to the invention is suitable either for performance at low temperatures, e.g. at −90° C. to 0° C., or at higher temperatures, i.e. at at least 0° C., e.g. at 0° C. to +30° C. or at 0° C. to +50° C. The polymerization in the process according to the invention is, however, preferably performed at relatively low temperatures, generally at −70° C. to −10° C., especially at −60° C. to −15° C.

When the polymerization in the process according to the invention is effected at or above the boiling temperature of the monomer or monomer mixture to be polymerized, it is preferably performed in pressure vessels, for example in autoclaves or in pressure reactors.

The polymerization in the process according to the invention is preferably performed in the presence of an inert diluent. The inert diluent used should be suitable for reducing the increase in the viscosity of the reaction solution which generally occurs during the polymerization reaction to such an extent that the removal of the heat of reaction which evolves can be ensured. Suitable diluents are those solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes, and halogenated hydrocarbons, especially halogenated aliphatic hydrocarbons, such as methyl chloride, dichloromethane and trichloromethane (chloroform), 1,1-dichloroethane, 1,2-dichloroethane, trichloroethane and 1-chlorobutane, and also halogenated aromatic hydrocarbons and alkylaromatics halogenated in the alkyl side chains, such as chlorobenzene, monofluoromethylbenzene, difluoromethylbenzene and trifluoromethylbenzene, and mixtures of the aforementioned diluents. The diluents used, or the constituents used in the solvent mixtures mentioned, are also the inert components of isobutenic $C_4$ hydrocarbon streams. A non-halogenated solvent is preferred over the list of halogenated solvents.

The inventive polymerization may be performed in a halogenated hydrocarbon, especially in a halogenated aliphatic hydrocarbon, or in a mixture of halogenated hydrocarbons, especially of halogenated aliphatic hydrocarbons, or in a mixture of at least one halogenated hydrocarbon, especially a halogenated aliphatic hydrocarbon, and at least one aliphatic, cycloaliphatic or aromatic hydrocarbon as an inert diluent, for example a mixture of dichloromethane and n-hexane, typically in a volume ratio of 10:90 to 90:10, especially of 50:50 to 85:15. Prior to use, the diluents are preferably freed of impurities such as water, carboxylic acids or mineral acids, for example by adsorption on solid adsorbents such as activated carbon, molecular sieves or ion exchangers.

In a preferred embodiment, the inventive polymerization is performed in halogen-free aliphatic or especially halogen-free aromatic hydrocarbons, especially toluene. For this embodiment, water in combination with the organic hydroxyl compounds mentioned and/or the organic halogen compounds mentioned, or especially as the sole initiator, have been found to be particularly advantageous.

The polymerization in the process according to the invention is preferably performed under substantially aprotic and especially under substantially anhydrous reaction conditions. Substantially aprotic and substantially anhydrous reaction conditions are understood to mean that, respectively, the content of protic impurities and the water content in the reaction mixture are less than 50 ppm and especially less than 5 ppm. In general, the feedstocks will therefore be dried before use by physical and/or chemical measures. More particularly, it has been found to be useful to admix the aliphatic or cycloaliphatic hydrocarbons used as solvents, after customary prepurification and predrying with an organometallic compound, for example an organolithium, organomagnesium or organoaluminum compound, in an amount which is sufficient to substantially remove the water traces from the solvent. The solvent thus treated is then preferably condensed directly into the reaction vessel. It is also possible to proceed in a similar manner with the monomers to be polymerized, especially with isobutene or with the isobutenic mixtures. Drying with other customary desiccants such as molecular sieves or predried oxides such as aluminum oxide, silicon dioxide, calcium oxide or barium oxide is also suitable. The halogenated solvents for which drying with metals such as sodium or potassium or with metal alkyls is not an option are freed of water or water traces with desiccants suitable for that purpose, for example with calcium chloride, phosphorus pentoxide or molecular sieves. It is also possible in an analogous manner to dry those feedstocks for which treatment with metal alkyls is likewise not an option, for example vinylaromatic compounds. Even if some or all of the initiator used is water, residual moisture should preferably be very substantially or completely removed from solvents and monomers by drying prior to reaction, in order to be able to use the water initiator in a controlled, specified amount, as a result of which greater process control and reproducibility of the results are obtained.

The polymerization of the isobutene or of the isobutenic starting material generally proceeds spontaneously when the hydrocarbyloxy aluminum compound or mixtures of hydrocarbyloxy aluminum compounds or hydrocarbyloxy aluminum compound-donor complex, is contacted with the isobutene or the isobutenic monomer mixture at the desired reaction temperature. The procedure here may be to initially charge the monomers, optionally in the diluent, to bring it to reaction temperature and then to add the hydrocarbyloxy aluminum compound or mixtures of hydrocarbyloxy aluminum compounds or hydrocarbyloxy aluminum compound-donor complex. The procedure may also be to initially charge the hydrocarbyloxy aluminum compound or mixtures of hydrocarbyloxy aluminum compounds or hydrocarbyloxy aluminum compound-donor complex, optionally in the diluent, and then to add the monomers. In that case, the start of polymerization is considered to be that time at which all reactants are present in the reaction vessel.

To prepare isobutene copolymers, the procedure may be to initially charge the monomers, optionally in the diluent, and then to add the hydrocarbyloxy aluminum compound or mixtures of hydrocarbyloxy aluminum compounds or hydrocarbyloxy aluminum compound-donor complex.

The reaction temperature can be established before or after the addition of the hydrocarbyloxy aluminum compound or mixtures thereof or hydrocarbyloxy aluminum compound-donor complex. The procedure may also be first to initially charge only one of the monomers, optionally in the diluent, then to add the hydrocarbyloxy aluminum compound or mixtures thereof or hydrocarbyloxy aluminum compound-donor complex, and to add the further monomer(s) only after a certain time, for example when at least 60%, at least 80% or at least 90% of the monomer has been converted. Alternatively, the hydrocarbyloxy aluminum compound or mixtures thereof or hydrocarbyloxy aluminum compound-donor complex, can be initially charged, optionally in the diluent, then the monomers can be added simultaneously or successively, and then the desired reaction temperature can be established. In that case, the start of polymerization is considered to be that time at which the hydrocarbyloxy aluminum compound or mixtures thereof or hydrocarbyloxy aluminum compound-donor complex, and at least one of the monomers are present in the reaction vessel.

In addition to the batchwise procedure described here, the polymerization in the process according to the invention can also be configured as a continuous process. In this case, the feedstocks, i.e. the monomer(s) to be polymerized, optionally the diluent and optionally the hydrocarbyloxy aluminum compound or mixtures thereof or hydrocarbyloxy aluminum compound-donor complex, are supplied continuously to the polymerization reaction, and reaction product is withdrawn continuously, such that more or less steady-state polymerization conditions are established in the reactor. The monomer(s) to be polymerized can be supplied as such, diluted with a diluent or solvent, or as a monomer-containing hydrocarbon stream.

The hydrocarbyloxy aluminum compound or mixtures thereof or hydrocarbyloxy aluminum compound-donor complex effective as a polymerization catalyst, is generally present in dissolved, dispersed or suspended form in the polymerization medium. Supporting of the hydrocarbyloxy aluminum compound or mixtures thereof or hydrocarbyloxy aluminum compound-donor complex on customary support materials is also possible. Suitable reactor types for the polymerization process of the present invention are typically stirred tank reactors, loop reactors and tubular reactors, but also fluidized bed reactors, stirred tank reactors with or without solvent, fluid bed reactors, continuous fixed bed reactors and batchwise fixed bed reactors (batchwise mode).

In the process according to the invention, the hydrocarbyloxy aluminum compound or mixtures thereof or hydrocarbyloxy aluminum compound-donor complex, is generally used in such an amount that the molar ratio of aluminum in the hydrocarbyloxy aluminum compound or mixtures thereof or hydrocarbyloxy aluminum compound-donor complex, to isobutene in the case of homopolymerization of isobutene, or to the total amount of the polymerizable monomers used in the case of copolymerization of isobutene, is in the range from 1:5 to 1:5000, preferably from 1:10 to 1:5000, especially 1:15 to 1:1000, in particular 1:20 to 1:250.

To stop the reaction, the reaction mixture is preferably deactivated, for example by adding a protic compound, especially by adding water, alcohols such as methanol, ethanol, n-propanol and isopropanol or mixtures thereof with water, or by adding an aqueous base, for example an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate, or an alkali metal or alkaline earth metal hydrogencarbonate such as sodium, potassium, magnesium or calcium hydrogencarbonate.

The process according to the invention serves to prepare high-reactivity isobutene homo- or copolymers with a content of terminal vinylidene double bonds (a-double bonds) per polyisobutene chain end of at least 70, preferably at least 75 and very preferably at least 80 mol %, preferably of at least 85 mol %, more preferably of at least 90 mol %, more preferably of more than 91 mol % and especially of at least 95 mol %, for example of virtually 100 mol %. More particularly, it also serves to prepare high-reactivity isobutene copolymers which are formed from isobutene and at least one vinylaromatic monomer, especially styrene, and have a content of terminal vinylidene double bonds (a-double bonds) per polyisobutene chain end of at least 70, preferably at least 75 mol %, preferably of at least 80 mol %, preferably of at least 85 mol %, more preferably of at least 90 mol %, more preferably of more than 91 mol % and especially of at least 95 mol %, for example of virtually 100 mol %. To prepare such copolymers of isobutene and at least one vinylaromatic monomer, especially styrene, isobutene or an isobutenic hydrocarbon cut is copolymerized with the at least one vinylaromatic monomer in a weight ratio of isobutene to vinylaromatic of 5:95 to 95:5, especially of 30:70 to 70:30.

The high-reactivity isobutene homo- or copolymers prepared by the process according to the invention and specifically the isobutene homopolymers preferably have a polydispersity (PDI=$M_w/M_n$) of 1.05 to less than 3.5, preferably of 1.05 to less than 3.0, preferably of 1.05 to less than 2.5, preferably of 1.05 to 2.3, more preferably of 1.05 to 2.0 and especially of 1.1 to 1.85. Typical PDI values in the case of an optimal process regime are 1.2 to 1.7.

The high-reactivity isobutene homo- or copolymers prepared by the process according to the invention preferably possess a number-average molecular weight $M_n$ (determined by gel permeation chromatography) of preferably 500 to 250 000, more preferably of 500 to 100 000, even more preferably of 500 to 25 000 and especially of 500 to 5000. Isobutene homopolymers even more preferably possess a number-average molecular weight $M_n$ of 500 to 10 000 and especially of 500 to 5000, for example of about 1000 or of about 2300.

Some of the isobutene polymers which have terminal vinylidene double bonds and also comprise incorporated initiator molecules and occur as the predominant proportion in the isobutene homopolymers prepared in accordance with the invention are novel compounds. The present invention therefore also provides isobutene polymers of the general formula I (I)

in which $R^{10}$, $R^{11}$ and $R^{12}$ are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more $C_1$- to $C_4$alkyl- or $C_1$- to $C_4$-alkoxy radicals or moieties of the general formula II (II)

as substituents, where not more than one of the variables $R^{10}$, $R^{11}$ or $R^{12}$ is hydrogen and at least one of the variables $R^{10}$, $R^{11}$ or $R^{12}$ is phenyl which may also bear one or more $C_1$- to $C_4$-alkyl- or $C_1$- to $C_4$-alkoxy radicals or moieties of the general formula II as substituents, and n is a number from 9 to 4500, preferably 9 to 180, especially 9 to 100, in particular 12 to 50. In a preferred embodiment, $R^{10}$, $R^{11}$ and $R^{12}$ are each independently hydrogen, $C_1$- to $C_4$-alkyl, especially methyl, ethyl, n-propyl, isopropyl, n-butyl, isobutyl, sec.-butyl or tert-butyl, or phenyl which may also bear one or two $C_1$- to $C_4$-alkyl- or $C_1$- to $C_4$-alkoxy radicals or moieties of the general formula II as substituents, where not more than one of the variables $R^{10}$, $R^{11}$ and $R^{12}$ is hydrogen and at least one of the variables $R^{10}$, $R^{11}$ and $R^{12}$ is phenyl which may also bear one or two $C_1$- to $C_4$-alkyl or $C_1$- to $C_4$-alkoxy radicals or moieties of the general formula II as substituents, and n is a number from 9 to 4500, preferably 9 to 180, especially 9 to 90, in particular 15 to 45.

The process according to the invention successfully polymerizes isobutene or isobutene-comprising monomer mixtures under cationic conditions with satisfactory to high conversions of generally 20 to 100%, especially 35 to 90%, in short reaction times of generally 5 to 120 minutes, especially 30 to 120 minutes, to give high-reactivity isobutene homo- or copolymers with a content of terminal vinylidene double bonds per polyisobutene chain end of at least 70, preferably at least 75 and very preferably at least 80 mol % and with a narrow molecular weight distribution.

The examples which follow are intended to illustrate the present invention in detail without restricting it.

EXAMPLES

The polymerization reactions were carried out in glass tubes equipped with a cold finger condenser or, in some cases, in stainless steel reactor with PTFE lining under argon atmosphere at 10° C. As an example of a typical procedure, polymerization was initiated by adding isobutylene (3.25 g, 5.8×10$^{-2}$ mol) to a mixture of a total volume of 5.16 mL, consisting of solutions of diisopropyl ether (0.38 mL, 0.1M) in n-hexane and BuOAlCl$_2$ (0.38 mL, 1M) in toluene and n-hexane (4.4 mL). After 10 min reaction time, ca. 2 mL of ethanol was poured into the reactor to terminate the polymerization. The quenched reaction mixtures were diluted by n-hexane, washed with 0.5 M nitric acid and deionized water to remove the aluminum-containing residues, evaporated to dryness under reduced pressure, and dried in vacuum (60° C.) to give the polymeric products.

Product yields were determined gravimetrically. The number average molecular weight $M_n$ and the weight average molecular weight $M_w$ was determined by means of Size Exclusion Chromatography (SEC, $M_{nSEC}$) with polystyrene standards, or by $^1$H NMR ($M_{nNMR}$). The polydispersity PDI=$M_w/M_n$ was calculated using the thus obtained values. Composition of reaction products was determined by the $^1$H-NMR method and assigned to structures as described in Shiman, D. I.; Vasilenko, I. V.; Kostjuk, S. V. "Cationic Polymerization of Isobutylene by AlCl$_3$/Ether Complexes in Non-Polar Solvents: Effect of Ether Structure on the Selectivity of β-H Elimination", *Polymer* 2013, 54, 2235-2242, FIG. 4.

Figure 1:
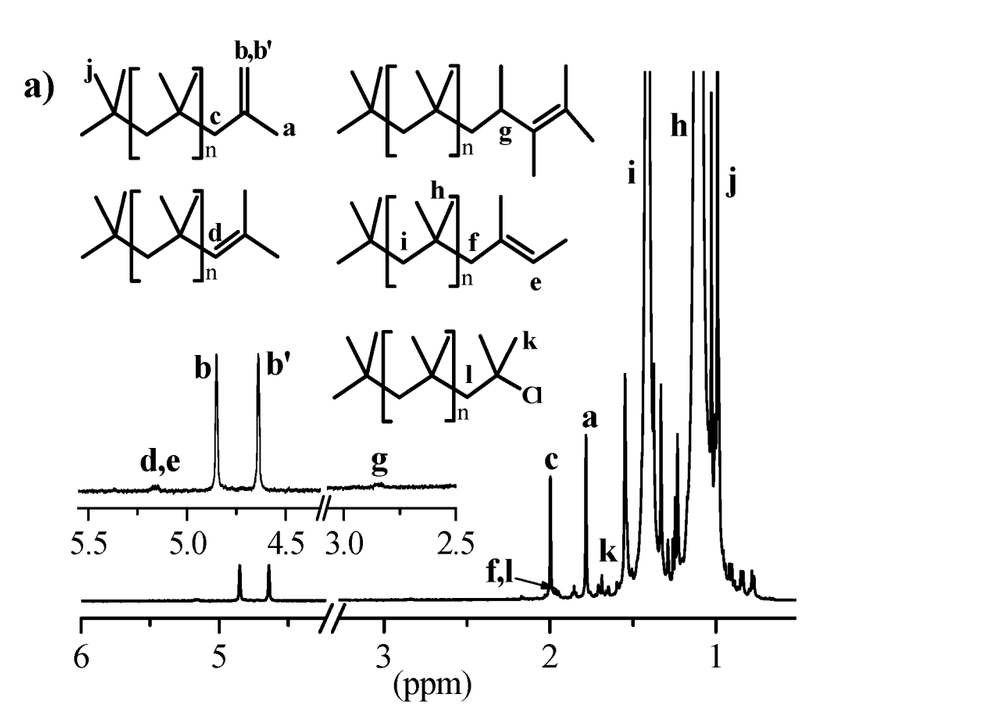
The FIGURE shows $^1$H-NMR shifts attributed to structural elements.

The $^1$H-NMR shifts are attributed to the structural elements, as shown in the FIGURE.

In the context of the present invention the term "exo" refers to terminal ethylenic double bonds, vinylidene groups or a-double bonds, as shown in the formula on page 1 of this document. These terms are used synonymously throughout the text. The term "Total vinylidene" means the terminal ethylenic double bonds referred to as exo above and additionally double bonds located internally at the polymer backbone as shown in the following formula:

The terms "endo" and "trisubstituted" refer to β-double bonds, as shown in the formulae above in the second line. These terms are used synonymously throughout the text.

Furthermore "tetrasubstituted" structural elements can be found as shown in the formula at the top right. Furthermore, a chlorinated polyisobutene (PIBCI) was found.

Example 1 (Comparative)

A polymerization reaction run as described above using $(BuO)_1AlCl_2$ as catalyst in the presence of 0.1 equivalent of diisopropyl ether towards $(BuO)_1AlCl_2$. A polyisobutylene polymer with $M_n$(SEC)=2100 g/mol ($M_n$(NMR)=1610 g/mol) was obtained in 95% yield. The polydispersity and double bond distribution are presented in Table 1.

| PDI | Exo | Total vinylidene | Trisubstituted | Tetrasubstituted |
|---|---|---|---|---|
| 4.3 | 89 | 89 | 6 | 5 |

Example 2

A polymerization reaction run as described above but $(iPrO)_1AlCl_2$ was used instead of $(BuO)_1AlCl_2$. A polyisobutylene polymer with $M_n$(SEC)=1960 g/mol ($M_n$(NMR)=1470 g/mol) was obtained in 97% yield. The polydispersity and double bond distribution are presented in Table 2.

| PDI | Exo | Total vinylidene | Trisubstituted | Tetrasubstituted |
|---|---|---|---|---|
| 3.8 | 88 | 85 | 6 | 8 |

Example 3

A polymerization reaction run as described in Example 1 but without an addition of ether. A polyisobutylene polymer with $M_n$(SEC)=2700 g/mol ($M_n$(NMR)=2100 g/mol) was obtained in 100% yield. The polydispersity and double bond distribution are presented in Table 3.

| PDI | Exo | Total vinylidene | Trisubstituted | Tetrasubstituted | PIBCl |
|---|---|---|---|---|---|
| 3.7 | 46 | 46 | 26 | 23 | 5 |

Example 4

A polymerization reaction run as described in Example 1 but 0.8 equivalent of $iPr_2O$ to $(BuO)_1AlCl_2$ was introduced into system instead of 0.1 equivalent. A polyisobutylene polymer with $M_n$(SEC)=600 g/mol ($M_n$(NMR)=500 g/mol) was obtained in 27% yield. The polydispersity and double bond distribution are presented in Table 4.

| PDI | Exo | Total vinylidene | Trisubstituted | Tetrasubstituted |
|---|---|---|---|---|
| 5.7 | 94 | 97 | 2 | 1 |

Example 5

A polymerization reaction run as described in Example 1 but 0.1 equivalent of $Et_2O$ to $(BuO)_1AlCl_2$ was introduced into system instead of 0.1 equivalent of $iPr_2O$. A polyisobutylene polymer with $M_n$(SEC)=6530 g/mol ($M_n$(NMR)=5850 g/mol) was obtained in 55% yield. The polydispersity and double bond distribution are presented in Table 5.

| PDI | Exo | Total vinylidene | Trisubstituted | Tetrasubstituted |
|---|---|---|---|---|
| 3.8 | 70 | 73 | 17 | 10 |

Example 6

A polymerization reaction run as described in Example 4, but $(iPrO)_{0.8}AlCl_{2.2}$ was used as catalyst instead of $(BuO)_1AlCl_2$ in the presence of 0.8 equivalents of $iPr_2O$. A polyisobutylene polymer with $M_n$(SEC)=1140 g/mol ($M_n$(NMR)=1240 g/mol) was obtained in 74% yield. The polydispersity and double bond distribution are presented in Table 6.

| PDI | Exo | Total vinylidene | Trisubstituted | Tetrasubstituted |
|---|---|---|---|---|
| 4.9 | 73 | 74 | 12 | 15 |

Example 7

A polymerization reaction run as described in Example 6 but $(Bu)_{0.8}AlCl_{2.2}$ was used as catalyst instead of $(iPrO)_{0.8}AlCl_{2.2}$ in the presence of 0.8 equivalents of $iPr_2O$. A polyisobutylene polymer with $M_n$(SEC)=680 g/mol ($M_n$(NMR)=660 g/mol) was obtained in 44% yield. The polydispersity and double bond distribution are presented in Table 7.

| PDI | Exo | Total vinylidene | Trisubstituted | Tetrasubstituted |
|---|---|---|---|---|
| 5.3 | 93 | 96 | 3 | 1 |

Example 8

A polymerization reaction run as described in Example 6 but (PhO)$_{0.8}$AlCl$_{2.2}$ was used as catalyst instead of (iPrO)$_{0.8}$AlCl$_{2.2}$ in the presence of 0.8 equivalents of iPr$_2$O. A polyisobutylene polymer with M$_n$(SEC)=1760 g/mol (M$_n$(NMR)=1750 g/mol) was obtained in 22% yield. The polydispersity and double bond distribution are presented in Table 8.

| PDI | Exo | Total vinylidene | Trisubstituted | Tetrasubstituted |
|---|---|---|---|---|
| 4.3 | 74 | 75 | 13 | 12 |

Example 9

A polymerization reaction run as described in Example 6 but (iPrO)$_{0.8}$AlBr$_{2.2}$ was used as catalyst instead of (iPrO)$_{0.8}$AlCl$_{2.2}$ in the presence of 0.8 equivalents of iPr$_2$O. A polyisobutylene polymer with M$_n$(SEC)=1050 g/mol (M$_n$(NMR)=920 g/mol) was obtained in 71% yield. The polydispersity and double bond distribution are presented in Table 9.

| PDI | Exo | Total vinylidene | Trisubstituted | Tetrasubstituted |
|---|---|---|---|---|
| 2.6 | 85 | 87 | 7 | 6 |

Example 10

A polymerization reaction run as described in Example 9 but 1.0 equivalents of iPr$_2$O was added into the system instead of 0.8 equivalents. A polyisobutylene polymer with M$_n$(SEC)=940 g/mol (M$_n$(NMR)=840 g/mol) was obtained in 61% yield. The polydispersity and double bond distribution are presented in Table 10.

| PDI | Exo | Total vinylidene | Trisubstituted | Tetrasubstituted |
|---|---|---|---|---|
| 2.5 | 86 | 88 | 7 | 5 |

Example 11

A polymerization reaction run as described in Example 9 but 0.8 equivalents of different ethers were added into the system instead of iPr$_2$O. The yield, molecular weight, polydispersity and double bond distribution are presented in Table 11.

| Ether | Conv. (%) | M$_n$ (SEC) | M$_n$ (NMR) | PDI | Exo | Total vinylidene | Trisubstituted | Tetrasubstituted |
|---|---|---|---|---|---|---|---|---|
| ClEtOEt | 85 | 760 | 490 | 1.9 | 67 | 69 | 16 | 15 |
| Et$_2$O | 12 | 760 | 700 | 1.9 | 75 | 85 | 10 | 5 |
| PhOMe | 100 | 3050 | 3040 | 6.5 | 31 | 31 | 36 | 33 |

Example 12

A polymerization reaction run as described in Example 9 but (iPO)$_{0.6}$AlBr$_{2.4}$ was used instead of (iPO)$_{0.8}$AlBr$_{2.2}$. A polyisobutylene polymer with M$_n$(SEC)=780 g/mol (M$_n$(NMR)=680 g/mol) was obtained in 92% yield. The polydispersity and double bond distribution are presented in Table 12.

| PDI | Exo | Total vinylidene | Trisubstituted | Tetrasubstituted |
|---|---|---|---|---|
| 2.4 | 73 | 79 | 10 | 11 |

Example 13

A polymerization reaction run as described in Example 9 but 51 mM of (iPO)$_{0.8}$AlBr$_{2.2}$ was used instead of 38 mM. A polyisobutylene polymer with M$_n$(SEC)=1180 g/mol (M$_n$(NMR)=1230 g/mol) was obtained in 76% yield. The polydispersity and double bond distribution are presented in Table 13.

| PDI | Exo | Total vinylidene | Trisubstituted | Tetrasubstituted |
|---|---|---|---|---|
| 4.1 | 75 | 77 | 11 | 12 |

Example 14

A polymerization reaction run as described in Example 9 but 26 mM of (iPO)$_{0.8}$AlBr$_{2.2}$ was used instead of 38 mM. A polyisobutylene polymer with M$_n$(SEC)=1490 g/mol (M$_n$(NMR)=1690 g/mol) was obtained in 65% yield. The polydispersity and double bond distribution are presented in Table 14.

| PDI | Exo | Total vinylidene | Trisubstituted | Tetrasubstituted |
|---|---|---|---|---|
| 4.6 | 70 | 72 | 13 | 15 |

The invention claimed is:

1. A process for preparing a highly reactive isobutene homopolymer or a highly reactive isobutene copolymer having a content of terminal vinylidene double bonds of at least 70 mol % per polyisobutene chain end, the process comprising:
   polymerizing isobutene or an isobutene-comprising monomer mixture in the presence of a hydrocarbyloxy aluminum compound Al(OR$^a$)$_p$(R$^b$)$_q$X$_r$, or a mixture thereof,
   wherein
   R$^a$ and R$^b$ independently represent an organic residue of up to 20 carbon atoms,
   X independently represents halide,
   p represents a rational number of greater than 0 and less than 3,
   q represents a rational number of at least 0 and less than 3, and r represents a rational number of at least 0 and less than 3, with the proviso that a sum of (p+q+r) is always 3, effective as a polymerization catalyst, optionally in the presence of at least one donor compound, producing a highly reactive isobutene homopolymer or a highly reactive isobutene copolymer having a number-average molecular weight ($M_n$) of 500 to about 2,300.

2. The process according to claim 1, wherein $R^a$ is a $C_1$-to $C_4$- alkyl radical.

3. The process according to claim 1, wherein $R^b$ is a $C_1$-to $C_4$- alkyl radical.

4. The process according to claim 1, wherein X is chloride or bromide.

5. The process according to claim 1, wherein when the at least one donor compound is present, the at least one donor compound is selected from the group consisting of an ether, a hydrocarbyl carboxylate, an ether, an alcohol, aldehyde, a ketone, and a phenol.

6. The process according to claim 5, wherein when the at least one donor compound is an ether, the either is at least one ether of formula:

$R^1$-O-$R^2$, wherein $R^1$ and $R^2$ are each independently $C_1$- to $C_{20}$- alkyl radicals.

7. The process according to claim 6, wherein when the at least one donor compound is a hydrocarbyl carboxylate, the hydrocarbyl carboxylate is at least one hydrocarbyl carboxylate of formula $R^3$-$COOR^4$, wherein $R^3$ and $R^4$ are each independently $C_1$- to $C_{20}$- alkyl radicals.

8. The process according to claim 1, wherein the polymerizing comprising polymerizing with an initiator which is selected from the group consisting of an organic hydroxyl compound in which one or more hydroxyl groups are each bonded to an sp3-hybridized carbon atom, an organic halogen compound in which one or more halogen atoms are each bonded to an sp3-hybridized carbon atom and water.

9. The process according to claim 8, wherein said initiator is selected from the group consisting of water, methanol, ethanol, 1-phenylethanol, 1-(p-methoxyphenyl)ethanol, n-propanol, isopropanol, 2-phenyl-2-propanol, n-butanol, isobutanol, sec.-butanol, tert-butanol, 1-phenyl- 1-chloroethane, 2-phenyl-2-chloropropane, tert-butyl chloride and 1,3- and 1,4-bis(1- hydroxy-1-methylethyl) benzene.

10. The process according to claim 8, wherein a molar ratio of said initiator to an isobutene monomer used in homopolymerization of isobutene, or to a total amount of polymerizable monomers used in copolymerization of isobutene, based on each individual functional site of said initiator, is from 0.0005:1 to 0.1:1, or when water is used as an initiator or in combination with an organic hydroxyl compound and/or an organic halogen compound as an additional initiator, a molar ratio of the water to the isobutene monomer used in the homopolymerization of isobutene, or to a total amount of the polymerizable monomers used in the copolymerization of isobutene, is from 0.0001:1 to 0.1:1.

11. The process according to claim 1, wherein the polymerization is performed at a temperature of −90° C. to +30° C.

12. The process according to claim 1, wherein the polymerization is performed in a halogen-free solvent.

13. The process according to claim 1, wherein the hydrocarbyloxy aluminum compound is free of any additional Bronsted acids.

14. The process according to claim 1, further comprising stopping said polymerizing by adding a protic compound.

15. The process according to claim 5, wherein a molar ratio of said donor compound to said hydrocarbyloxyaluminum compound is 0.2:1 to 1.5:1.

16. The process according to claim 1, wherein said homopolymer or said highly reactive isobutene copolymer has a content of terminal vinylidene double bonds of at least 75 mol %.

17. The process according to claim 1, wherein said homopolymer or said highly reactive isobutene copolymer has a polydispersity of 1.05 to less than 3.5.

* * * * *